United States Patent [19]

Araki et al.

[11] Patent Number: 5,043,723

[45] Date of Patent: Aug. 27, 1991

[54] MEMORY REMOTE CONTROL DEVICE

[75] Inventors: Yasuhiro Araki; Masaru Nanbu, both of Yaita, Japan

[73] Assignee: Sharp Kabushiki Kaisha, Osaka, Japan

[21] Appl. No.: 470,935

[22] Filed: Jan. 26, 1990

[30] Foreign Application Priority Data

Jan. 27, 1989 [JP] Japan .................. 1-18499
Feb. 20, 1989 [JP] Japan .................. 1-19346[U]
May 9, 1989 [JP] Japan .................. 1-53860[U]

[51] Int. Cl.[5] .................. G08C 19/00; H04L 27/10

[52] U.S. Cl. .................. 340/825.690; 340/825.58; 340/825.59; 375/55

[58] Field of Search .................. 340/825.57, 825.69, 340/825.72, 825.58, 825.59; 455/603, 608; 358/194.1; 375/55

[56] References Cited

U.S. PATENT DOCUMENTS

| | | | |
|---|---|---|---|
| 4,535,333 | 8/1985 | Twardowski | 340/825.72 X |
| 4,623,887 | 11/1986 | Welles | 340/825.57 |
| 4,626,848 | 12/1986 | Ehlers | 340/825.57 X |
| 4,692,762 | 9/1987 | Lewiner et al. | 340/825.69 |
| 4,802,114 | 1/1989 | Sagame | 340/825.72 X |
| 4,866,434 | 9/1989 | Keenan | 340/825.57 X |

OTHER PUBLICATIONS

"Low Voltage IR Control Transmitter (RC-5)" Development Data, Jul. 1983.

"PCM Remote Control Chips Detect Transmission Errors", G. Torelli and A. Hennigan, Electronic Engineering, Apr. 1983.

*Primary Examiner*—Donald J. Yusko
*Assistant Examiner*—Brian Zimmerman
*Attorney, Agent, or Firm*—Merchant, Gould, Smith, Edell, Welter & Schmidt

[57] ABSTRACT

A memory remote control device which comprises a wave shaping circuit for shaping a received remote-controlled signal and for outputting a pulse signal and an envelope signal, and a microcomputer operable to convert the remote-controlled signal into data for storage in a memory and for reproducing the remote-controlled signal on the basis of the data stored in the memory. This microcomputer comprises an input port for receiving the received remote-controlled signal; a determining circuit for determining whether or not the received remote-controlled signal is a remote-controlled signal of particular format on the basis of the pulse signal and the envelope signal; a memory operable to convert the remote-controlled signal into data and storing the data in the memory on the basis of the remote-controlled signal inputted to the input port in the event that the received remote-controlled signal has been the remote-controlled signal of particular format; and a reproducing circuit for reproducing the remote-controlled signal of particular format on the basis of the data stored in the memory.

4 Claims, 10 Drawing Sheets

Start
Set SW to STORE Position
m1
Key ON
m2
I
One Beep
m3
Input of Signal A
m4
Two Beeps
LED1 ON(Repeat)
m5
Key OFF
m6
Key ON
m7
One Beep
m8
Input of Signal B
m9
m10
A = B
YES
m11
Signal B Stored
NO
m14
1Bit Change?
YES
Signal A
Signal B
Stored
NO
m16
II
III

MEMORY REMOTE CONTROL DEVICE

BACKGROUND OF THE INVENTION

1. Field of the Invention

The present invention relates to a learning remote control device, a so-called "memory remote control", having a learning capability in which a remote-controlled signal can be stored in a memory after such remote-controlled signal has been received and analyzed and can be reproduced for transmission on the basis of data stored in the memory.

2. Description of the Prior Art

In the memory remote control device, the remote-controlled signal is received and analyzed for conversion into data which are subsequently stored in a memory. According to the prior art as shown in FIG. 15, the remote-controlled signal received by a photodiode 1 is supplied to a wave shaping circuit 2, having a one-shot circuit built therein, by which the received remote-controlled signal is shaped into a pulse signal and also into an envelope signal from which a carrier wave has been removed on the basis of the pulse signal. These pulse and envelope signals are supplied to a microcomputer 3 which is operable to measure and calculate necessary data such as the frequency of the carrier wave of the received remote-controlled signal, etc., on the basis of the pulse and envelope signals for storage into the memory.

Generally in the memory remote control device, a logic determination of digital data "0" and "b 1" is carried out in reference to a period between the set-up and set-down timings of the pulse of the received remote-controlled signal. However, in some European countries, as shown in FIG. 16, a unique logic determination is employed in which the set-up and set-down timings of the pulse signal within a predetermined time T are deemed to be "1" and "0", respectively and, where such unique logic determination is employed, there is available two type of remote-controlled signals; one being the remote-controlled signal modulated by the carrier wave and the other being the remote-controlled signal having no carrier wave.

FIG. 17 illustrates waveforms of various signals used for the explanation of the operation in which the remote-controlled signal modulated by the carrier wave in the environments in which the above described unique logic determination is employed is analyzed by the prior art memory remote control device of the construction shown in FIG. 15. In this figure, FIG. 17(A) represents a logic of the received remote-controlled signal; FIG. 17(B) represents the received remote-controlled signal; FIG. 17(C) represents an enlarged view thereof; FIG. 17(D) represents the pulse signal shaped into a pulse by the wave shaping circuit 2; FIG. 17(E) represents the envelope signal from which the carrier wave has been removed; and FIG. 17(F) represents a remote-controlled signal which has been reproduced.

In the wave shaping circuit 2 having the one-shot circuit built therein, the pulse signal having a predetermined pulse width as shown in FIG. 17(D) is outputted on the basis of the set-up timing of the received remote-controlled signal shown in FIG. 17(C) and the envelope signal shown in FIG. 17(E) is also outputted when the envelope signal sets up in synchronism with the set-up timing of the pulse signal and sets down when the pulse signal is not present during a predetermined period $\alpha$.

As hereinabove described, while the wave shaping circuit 2 detects the set-up timing of the received remote-controlled signal, the set-down timing corresponding to the logic "0" of the remote-controlled signal tends to be detected as the set-up of the carrier wave because of the presence of the carrier wave, which is subsequently converted into data. Therefore, it can be processed and treated as is the case with a remote-controlled signal which has been modulated according to a pulse position modulation (PPM) scheme such as generally employed in Japan.

In other words, the microcomputer 3 calculates the number N of pulses during a high level period of the envelope signal, measures one cycle period t1 of the envelope signal and a low level period t2 of the envelope signal and calculates the frequency f of the carrier wave according to the following equation on the basis of these data.

$$f=(N-1)/(t1-t2-\alpha)$$

The data including the frequency of the carrier wave of the remote-controlled signal so analyzed are stored in the memory and, on the basis of the data so stored in the memory, the remote-controlled signal can be faithfully reproduced for transmission as shown in FIG 17(F).

On the other hand, FIG. 18 illustrates waveforms used for the explanation of the operation in which the remote-controlled signal has no carrier wave in the environments in which the above described unique logic determination is employed. In this figure, FIG. 18(A) represents the logic of the received remote-controlled signal; FIG. 18(B) represents the received remote-controlled signal; FIG. 18(C) represents a pulse signal which has been shaped into a pulse by the wave shaping circuit; FIG. 18(D) represents the envelope signal; and FIG. 18(E) represents a remote-controlled signal which has been reproduced.

In such case, since there is no carrier wave, the set-down timing corresponding to the logic "0" of the remote-controlled signal will not be detected and, therefore, the remote-controlled signal reproduced will be an erroneous one as shown in FIG. 18(E).

In the prior art memory remote control device in which the set-up timing of the remote-controlled signal is detected for the conversion into the data, there is a problem in that no remote-controlled signal can be accurately reproduced where the remote-controlled signal has no carrier wave employing the unique logic determination in which the set-up and set-down timings of the pulse signal within the predetermined period T are deemed to be logic "1" and logic "0", respectively, such as employed in some European countries.

Also, generally in the learning remote control device, during a storage mode in which a remote-controlled signal from a remote control device to be learned (which device is hereinafter referred to as "to-be-learned remote control device" is to be stored, a key of the to-be-learned remote control device to be stored is manipulated, and the learning remote control device receives and analyzes the remote-controlled signal transmitted from the to-be-learned remote control device in correspondence with the above mentioned key for the temporary storage in the memory. Subsequently, the same key of the to-be-learned remote control device is again manipulated, and the learning remote control compares the second received remote-controlled signal with the first received remote-controlled signal stored in the memory and finally stores the second received remote-controlled signal as a properly inputted signal in the event that the first and second received remote-controlled signals coincide with each other, thereby completing the storage.

Thus, in the prior art learning remote control device, the storage takes place when the first and second received remote-controlled signals coincide with each other and, therefore, it is necessary for a remote-controlled signal of identical code to be transmitted each time a key is manipulated.

On the other hand, the remote-controlled signal employed in some European countries includes such a remote-controlled signal in which, each time a key is manipulated, a particular bit varies, that is, the third bit from the beginning of a remote-controlled code varies in such a manner, 0, 1, 0, 1 . . . , each time a key is manipulated, and alternatively employ remote-controlled signal in which particular two bits vary, that is, the first and second bits from the beginning of the remote-controlled code vary in such a manner, 00, 01, 10, 11, 00, 01, 11, 00 . . . .

With these remote-controlled signal, since the code of the remote-controlled signal varies each time the key is manipulated, and therefore, in the prior art learning remote control device designed to store the signal when the first and second received remote-controlled signals coincide with each other, there is a problem in that no signal can be stored.

SUMMARY OF THE INVENTION

The present invention has been devised with a view to substantially eliminating the above described problems inherent in the prior art memory remote control device and has for its essential object to provide an improved memory remote control device which is effective to accurately reproduce a remote-controlled signal even in the case of a remote-controlled signal of particular format, for example, the remote-controlled signal having no carrier wave which requires the employment of the special logic determination.

Another object of the present invention is to provide an improved learning remote control device of a type wherein, each time a key in the remote control device is manipulated, a remote-controlled signal of a type wherein a code of particular bit varies can be stored.

In order to accomplish the above described objects of the present invention, there is provided a memory remote control device which comprises a wave shaping circuit for shaping a received remote-controlled signal and for outputting a pulse signal and an envelope signal, and a microcomputer operable to convert the remote-controlled signal into data for storage in a memory and for reproducing the remote-controlled signal on the basis of the data stored in the memory. The microcomputer employed in the memory remote control comprises an input port means for receiving the received remote-controlled signal; a determining means for determining whether or not the received remote-controlled signal is a remote-controlled signal of particular format on the basis of the pulse signal and the envelope signal; a storing means operable to convert the remote-controlled signal into data and to store the data in the memory on the basis of the remote-controlled signal inputted to the input port means in the event that the determining means indicates the received remote-controlled signal is the remote-controlled signal of the particular format; and a reproducing device for reproducing the remote-controlled signal of particular format on the basis of the data stored in the memory.

According to the above described construction, on the basis of the pulse signal and the envelope signal outputted from the wave shaping circuit, a decision is made to determine whether or not the received remote-controlled signal is the remote-controlled signal of particular format, for example, the remote-controlled signal not having the carrier wave but utilizing the above described unique logic determination. Should the result of decision indicate that the received remote-controlled signal is the remote-controlled signal of particular format, the remote-controlled signal is converted into data on the basis of the remote-controlled signal inputted directly to the input port means and is then stored in the memory. On the basis of the data so stored in the memory, the remote-controlled signal of particular format can be accurately reproduced, thereby accomplishing a reliable reproduction of the remote-controlled signal.

According to the present invention, there is also provided a learning remote control device of a type capable of receiving and storing a remote-controlled signal from a to-be-learned remote control device and of reproducing the stored remote-controlled signal for transmission, which device is operable in such a manner that a remote-controlled signal received in correspondence with the first key manipulation of the to-be-learned remote control device and a remote-controlled signal received in correspondence with the second key manipulation of the to-be-learned remote control device are compared during a storage mode in which the remote-controlled signal can be stored, and such remote-controlled signal can be stored in the event that said remote-controlled signal received in correspondence with the first key manipulation of the to-be-learned remote control device and said remote-controlled signal received in correspondence with the second key manipulation of the to-be-learned remote control device coincide with each other. The learning remote control device of the above described type comprises a determining means operable to determine whether or not it is a remote-controlled signal of a format wherein the code of a particular bit varies each time the key is operated, by referring to both of said remote-controlled signals received in correspondence with the first key manipulation of the to-be-learned remote control device and said remote-controlled signal received in correspondence with the second key manipulation of the to-be-learned remote control device in the event that said remote-controlled signal received in correspondence with the first key manipulation of the to-be-learned remote control device and said remote-controlled signal received in correspondence with the second key manipulation of the to-be-learned remote control device do not coincide with each other.

With the above described construction, in the event that the first and second received remote-controlled signals coincide with each other, the remote-controlled signal can be stored as is the case with the general remote-controlled signal wherein the code does not vary. On the other hand, in the event that the first and second received remote-controlled signals do not coincide with each other, reference is made to the respective codes of these signals to determine whether or not the remote-controlled signal is of a type wherein the code of particular bit varies and, if so indicated, the remote-controlled signal corresponding to such format is stored. Therefore, it is possible to learn any one of the generally utilized remote-controlled signals and including the remote-controlled signal of a type wherein the code of particular bit varies each time the key is manipulated.

Again, according to the present invention, there is provided a learning remote control device capable of receiving a remote-controlled signal of a type wherein a remote-controlled code of particular bit reverses each time a key is manipulated, categorizing it into a plurality of category data, storing it as a category number data in a memory and of reproducing and transmitting the remote-controlled signal on the basis of the category number data read out from the memory. The learning remote control device of the above described type comprises a storage means in which a a category data providing a reference for the categorization is stored; a converting means for categorizing the received remote-controlled signal according to the category data in the storage means to provide category number data; a reversed category number data formulating means for formulating reversed category number data, wherein a particular bit of the category number data has been reversed, on the basis of the category number data which have been converted by the converting means; and a comparing means for comparing a reversed category number data, corresponding to the remote-controlled signal received in correspondence with the first manipulation of a key during a storage mode in which the remote-controlled signal can be stored, and a category number data, corresponding to the remote-controlled signal received in correspondence with the second manipulation of a key, with each other. When the reversed category number data corresponding to the first manipulation of the key and the category number data corresponding to the second manipulation of the key coincide with each other, the category number data can be stored in the memory in response to an output from the comparing means.

With the above described construction, the received remote-controlled signal can be categorized into the plurality of the category data to provide the respective category number data for the required number of bits and, on the basis of the category number data, the reversed category number data corresponding to the remote-controlled signal wherein the particular bit of the remote-controlled signal is reversed are formulated. The reversed category number data corresponding to the first manipulation of the key during the storage mode and the category number data corresponding to the second manipulation of the key are then compared and, in the event that the both coincide with each other, the category number data can be stored in the memory. Therefore, each time the key of the remote control device is manipulated, the remote-controlled signal in which the code of particular bit varies can be stored.

BRIEF DESCRIPTION OF THE DRAWINGS

These and other objects and features of the present invention will become clear from the following description of the present invention taken in conjunction with preferred embodiments thereof with reference to the accompanying drawings, in which.

DETAILED DESCRIPTION OF THE EMBODIMENTS

Figure 1:
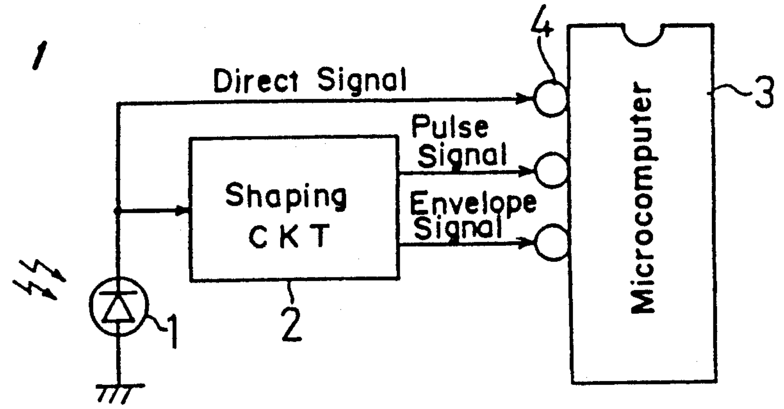
FIG. 1 is a schematic block circuit diagram showing an essential portion of a first preferred embodiment of the present invention.

Before the description of the preferred embodiments of the present invention proceeds, it is to be noted that like parts are designated by like reference numerals.

First Preferred Embodiment

Referring to FIG. 1 showing an essential portion of the first preferred embodiment of the present invention, a memory remote control device according to this first preferred embodiment of the present invention comprises a photodiode 1 for receiving a remote-controlled signal, a wave shaping circuit 2 having an one-shot circuit built therein and to which the received remote-controlled signal is supplied for wave shaping to provide a pulse signal and an envelope signal as is the case with the prior art remote control device. Both of the pulse and envelope signals outputted from the wave shaping circuit 2 are supplied to a microcomputer 3 which is, as is the case with that in the prior art remote control device, operable to measure and calculate necessary data such as, for example, the frequency of a carrier wave of the received remote-controlled signal and to store them in a memory (not shown) and also operable to reproduce a remote-controlled signal on the basis of the data so stored in the memory.

For the purpose that the remote-controlled signal can be reliably reproduced even in the case of the remote-controlled signal of a type having the carrier wave utilizable in the determination of a unique logic with which the set-up and set-down of a pulse signal within a predetermined period T are determined as "1" and "0", respectively, such as generally employed in some European countries, the memory remote control device according to the first preferred embodiment of the present invention is so designed as described hereinafter.

The microcomputer 3 includes an input port 4 to which the remote-controlled signal received by the photodiode 1 is supplied directly; a determining device for determining whether or not the received remote-controlled signal is a remote-controlled signal having no carrier wave utilizing the unique logic, that is, a remote-controlled signal of particular format, on the basis of a pulse signal and an envelope signal both outputted from the wave shaping circuit 2; a storing device operable to convert the remote-controlled signal into data and storing such data in the memory on the basis of the remote-controlled signal inputted to the input port 4 in the event that the determining device indicates that the received remote-controlled signal has been the remote-controlled signal of particular format; and a reproducing device for reproducing the remote-controlled signal of particular format on the basis of the data stored in the memory.

Figure 2:
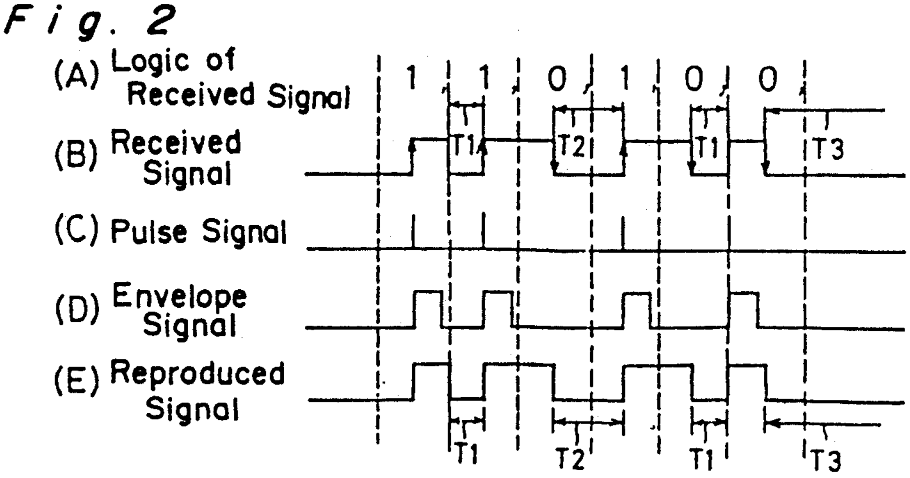
FIG. 2 is a chart showing respective waveforms of various signals used to explain the operation of the system of FIG. 1.

The operation in which the memory remote control device of the above described construction analyzes the remote-controlled signal having no carrier wave utilizing the determination of the unique logic will now be described with particular reference to the waveforms of FIG. 2 and the flowchart of FIG. 3. FIG. 2(A) represents the logic of the received remote-controlled signal; FIG. 2(B) represents the received remote-controlled signal; FIG. 2(C) represents the pulse signal which has been shaped into a pulse by the wave shaping circuit 2; FIG. 2(D) represents the envelope signal; and FIG. 2(E) represents the remote-controlled signal which has been reproduced.

The wave shaping circuit having the one-shot circuit built therein outputs the pulse signal of predetermined pulse width as shown in FIG. 2(C) on the basis of the set-up of the remote-controlled signal received as shown in FIG. 2(B) and, also, the envelope signal which sets up in synchronism with the set-up of the pulse signal and sets down in the event that the pulse signal is not present during a predetermined period.

As hereinabove described, since the wave shaping circuit 2 detects the set-up of the received remote-controlled signal, the set-down corresponding to the logic "0" of the remote-controlled signal will not be detected.

Figure 3:
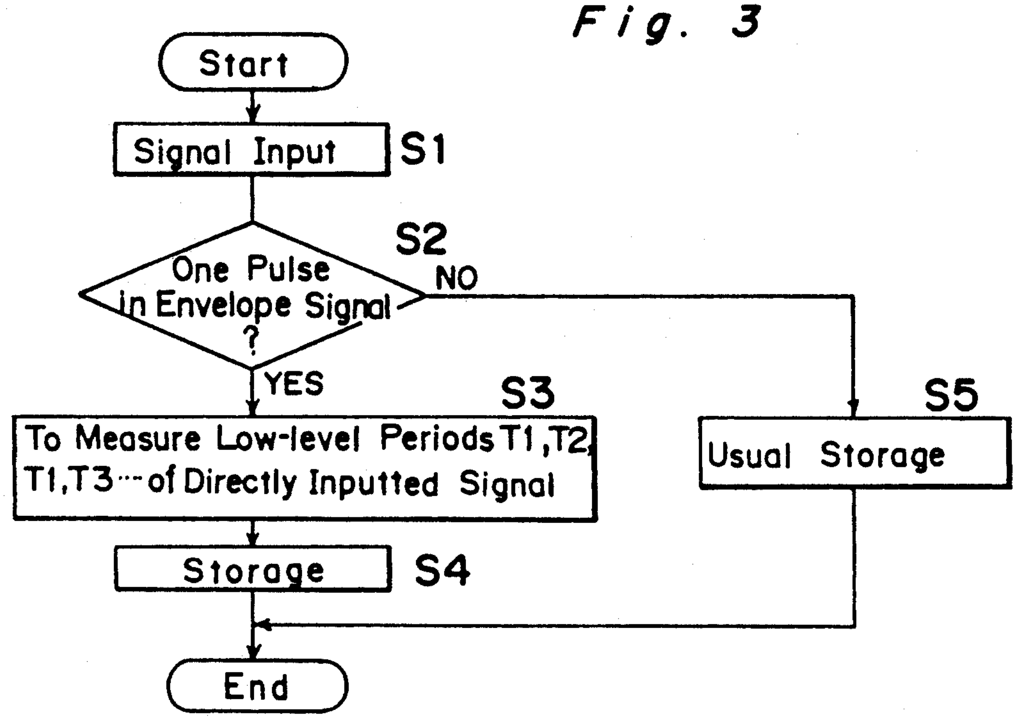
FIG. 3 is a flowchart showing the sequence of operation of the system according to the first preferred embodiment of the present invention.

Therefore, in the first preferred embodiment of the present invention, as shown in the flowchart of FIG. 3, when and after the signals have been inputted at step S1, step S2 takes place at which a decision is made to determine if there is one pulse signal during a high level period of the envelope signal. Should the result of the decision at step S2 indicate that the number of the pulse signals present during the high level period of the envelope signal is not one, that is, there is a plurality of pulse signals, it means that the received remote-controlled signal is not a remote-controlled signal of particular format, rather it is a remote-controlled signal having the carrier wave and, therefore, the program flow proceeds to step S5 at which a usual storing operation as is the case with the prior art takes place to store in the memory such data as the frequency of the carrier wave obtained on the basis of the pulse signal and the envelope signal, with the program flow subsequently terminating.

On the other hand, if the result of decision at step S2 indicates that there is only one pulse signal during the high level period of the envelope signal, it means that the received remote-controlled signal is a remote-controlled signal of particular format, that is, a remote-controlled signal having no carrier wave utilizing the unique logic determination as discussed above and, therefore, the program flow proceeds to step S3 at which low level periods T1, T2, T1, T3, . . . of the remote-controlled signal of the waveform of FIG. 2(B) are imputted directly to the input port 4 of the microcomputer 3 and then to convert them into data. At subsequent step S4, the data directly measured from the remote-controlled signal are stored in the memory and, at the same time, data obtained on the basis of the envelope signal and the pulse signal as is the case with the prior art are stored in the memory, with the program flow subsequently terminating.

As hereinabove described, in the event of the remote-controlled signal of particular format, the data are prepared on the basis of the remote-controlled signal imputted directly to the input port 4 of the microcomputer 3 and are then stored in the memory.

When it comes to a reproduction of a remote-controlled signal, as shown in FIG. 2(E), the remote-controlled signal is made to set down sequentially before each of the low level periods T1, T2, T1, T3, . . . stored in the memory from the timing at which the remote-controlled signal is subsequently set up. In other words, while according to the prior art shown in FIG. 18 the remote-controlled signal is made to set down sequentially after a predetermined period $\beta$ subsequent to the set-up of the remote-controlled signal, the set-down of the remote-controlled signal according to the preferred embodiment of the present invention now under discussion is sequentially made before each of the low level periods T1, T2, T1, T3, . . . stored in the memory from the timing at which the remote-controlled signal subsequently sets up.

Figure 18:
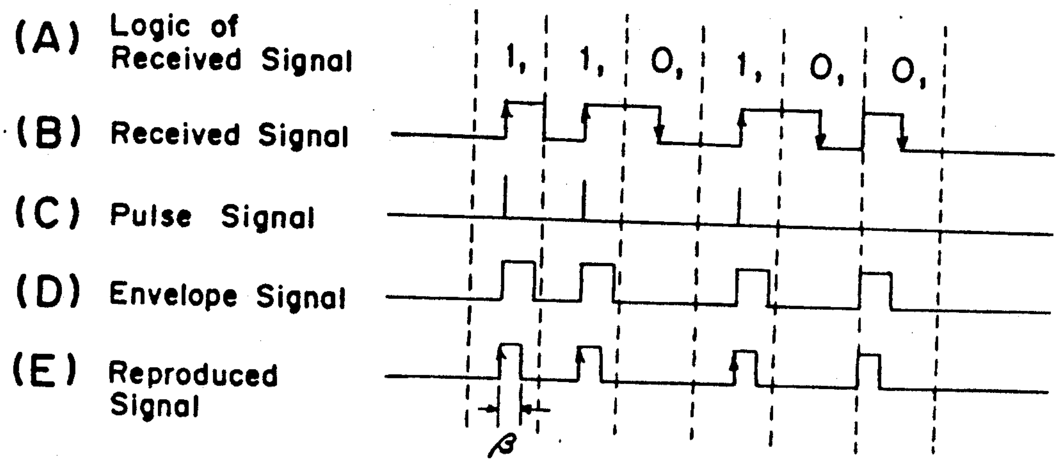
Fig. 18 Prior Art

In this way, as shown in FIG. 2(E), the reproduced remote-controlled signal corresponds substantially to the received remote-controlled signal of the waveform of FIG. 2(B) and, therefore, unlike the prior art system of FIG. 18, the set-down of the received signal can also be reproduced accurately.

Thus, according to the foregoing embodiment of the present invention, since in the event of the remote-controlled signal of particular format the remote-controlled signal is directly analyzed and converted into the data before it is stored in the memory and, on the basis of the data stored in the memory, the remote-controlled signal is subsequently reproduced, the remote-controlled signal of particular format which has hitherto been unable to be reproduced according to the prior art system wherein the remote-controlled signal is converted into the data on the basis of only the envelope and pulse signals can be advanageously reliably reproduced.

Second Preferred Embodiment

Figure 4:
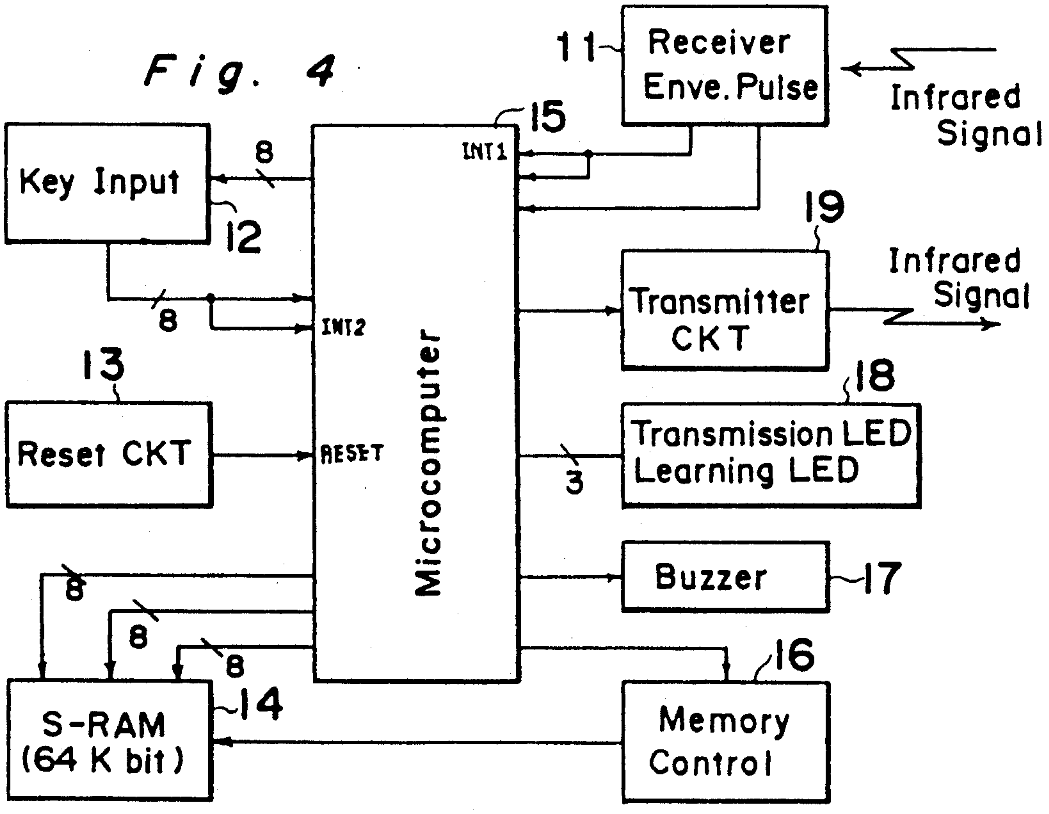
FIG. 4 is a block circuit diagram showing a second preferred embodiment of the present invention.

Referring now to FIG. 4 showing a block circuit diagram of the learning remote control device according to a second preferred embodiment of the present invention. Reference numeral 11 represents a receiving circuit for receiving an infrared remote-controlled signal emitted from a to-be-learned remote control device (not shown) and for outputting it to a microcomputer 15 after the waveform thereof has been shaped; reference numeral 12 represents a key input unit; reference numeral 13 represents a reset circuit; reference numeral 14 represents a static random access memory (S-RAM) for the storage of data processed by the microcomputer 15; reference numeral 16 represents a memory control circuit for controlling writing and reading operations relative to the static random access memory 14; reference numerals 17 and 18 represent a buzzer and a LED (light emitting diode) display for providing an operator with audio and visual indications as to operating procedures when the remote-controlled signal from the to-be-learned remote control device is to be stored in a manner as will be described later, respectively; and reference numeral 19 represents a transmitting circuit, including a light emitting diode and a drive circuit therefor, for transmitting the remote-controlled signal stored.

When, for example, the remote-controlled signal of the waveform shown in FIG. 5(A) is inputted to the receiving circuit 11, the receiving circuit 11 outputs to the microcomputer 15 both of a pulse signal of the waveform of FIG. 5(B), which is an output from a mono-stable multivibrator triggered in response to a set-up edge of the inputted signal, and an envelope signal of the waveform of FIG. 5(C) which, in the event that the interval of the pulse signal expands a value larger than a predetermined period α, sets down after the predetermined period α subsequent to the set-up edge of the final pulse of the continuous pulse signal and sets up in response to a set-up edge of the next succeeding pulse signal.

The microcomputer 15 which has a capability of functioning as a determining device as will be described later is operable to calculate, according to the following equation, for example, the frequency f of a carrier wave of the received remote-controlled signal on the basis of both of the pulse and envelope signals.

$$f=(N-1)/[t1-(t2+\alpha)]$$

wherein t1 represents a period between the initial set-up of the envelope signal to the next succeeding set-up of the envelope signal, t2 represents a period from the set-down of the envelope signal to the next succeeding set up of the envelope signal and N represents the number of pulse signals present during the period t1.

In this way, the microcomputer 15 causes the received remote-controlled signal to be converted into data, in a manner similar to that in the prior art, on the basis of the pulse signal and the envelope signal, which data are subsequently stored in the static random access memory 14.

In order for the learning remote control device to be able to learn any one of the remote-controlled signal, in which the code of particular bit varies each time a key is manipulated, such as generally utilized in some European countries, and the usual remote-controlled signal in which no code vary, the learning remote control device according to the second preferred embodiment of the present invention is so designed as follows.

The learning remote-control device according to the second preferred embodiment of the present invention comprises a determining device operable, during a storing mode and in the event that a remote-controlled signal received in correspondence with a first key manipulation of the to-be-learned remote control device and a remote-controlled signal received in correspondence with a second key manipulation thereof does not coincide with each other, to refer to respective codes of these two remote-controlled signals to determine whether or not it is a remote-controlled signal of a format wherein the code of a particular bit varies each time the key is operated, so that, in the event that the received remote-controlled signal is a remote-controlled signal of the format wherein the code of particular bit varies, the remote-controlled signal corresponding to such format can be stored in the static random access memory 14.

Figure 6A:
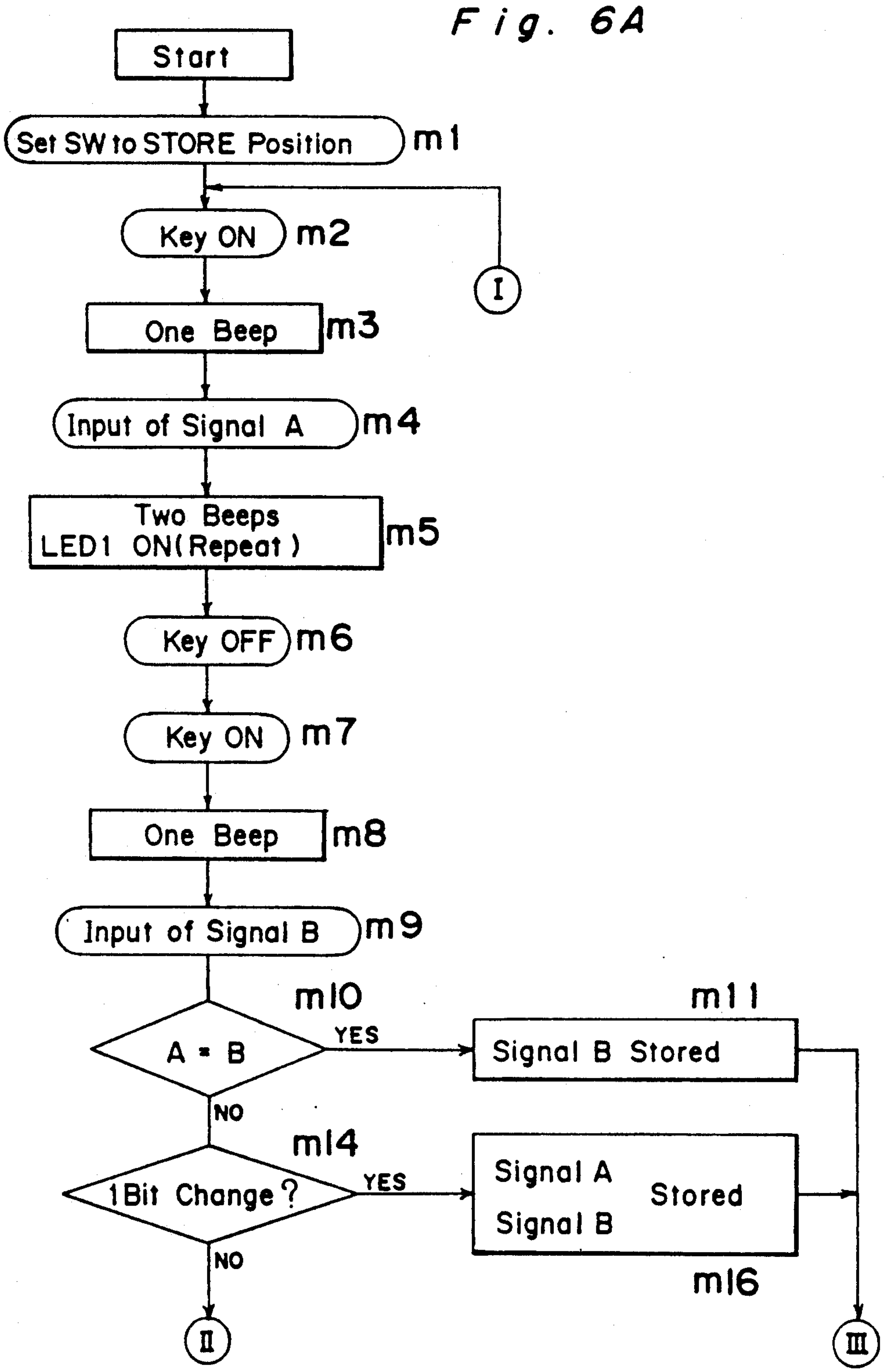
FIG. 6 comprised of FIGS. 6A and 6B is a flowchart showing the sequence of operation of the system according to the second preferred embodiment of the present invention.
Figure 6B:
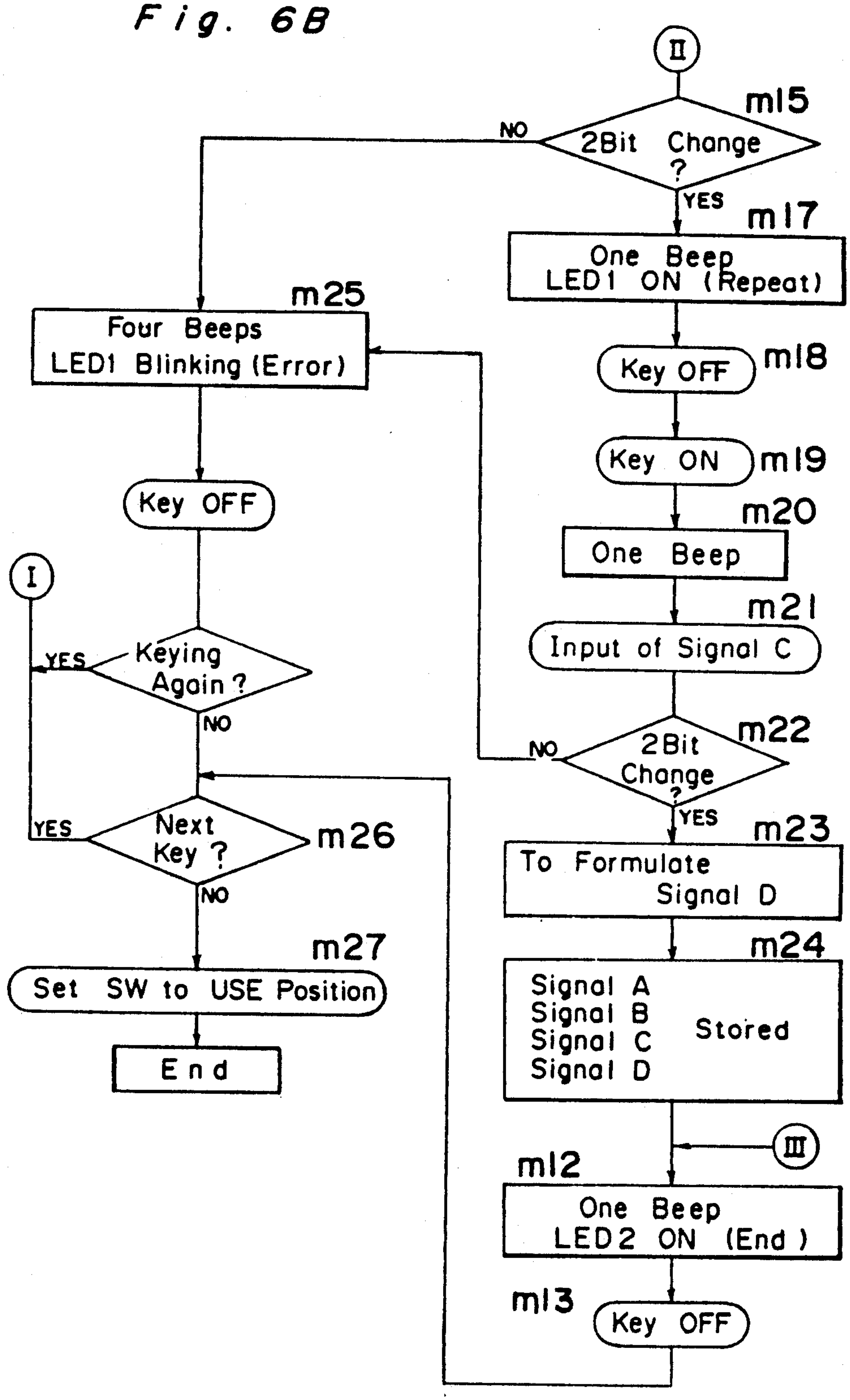
Figure 7:
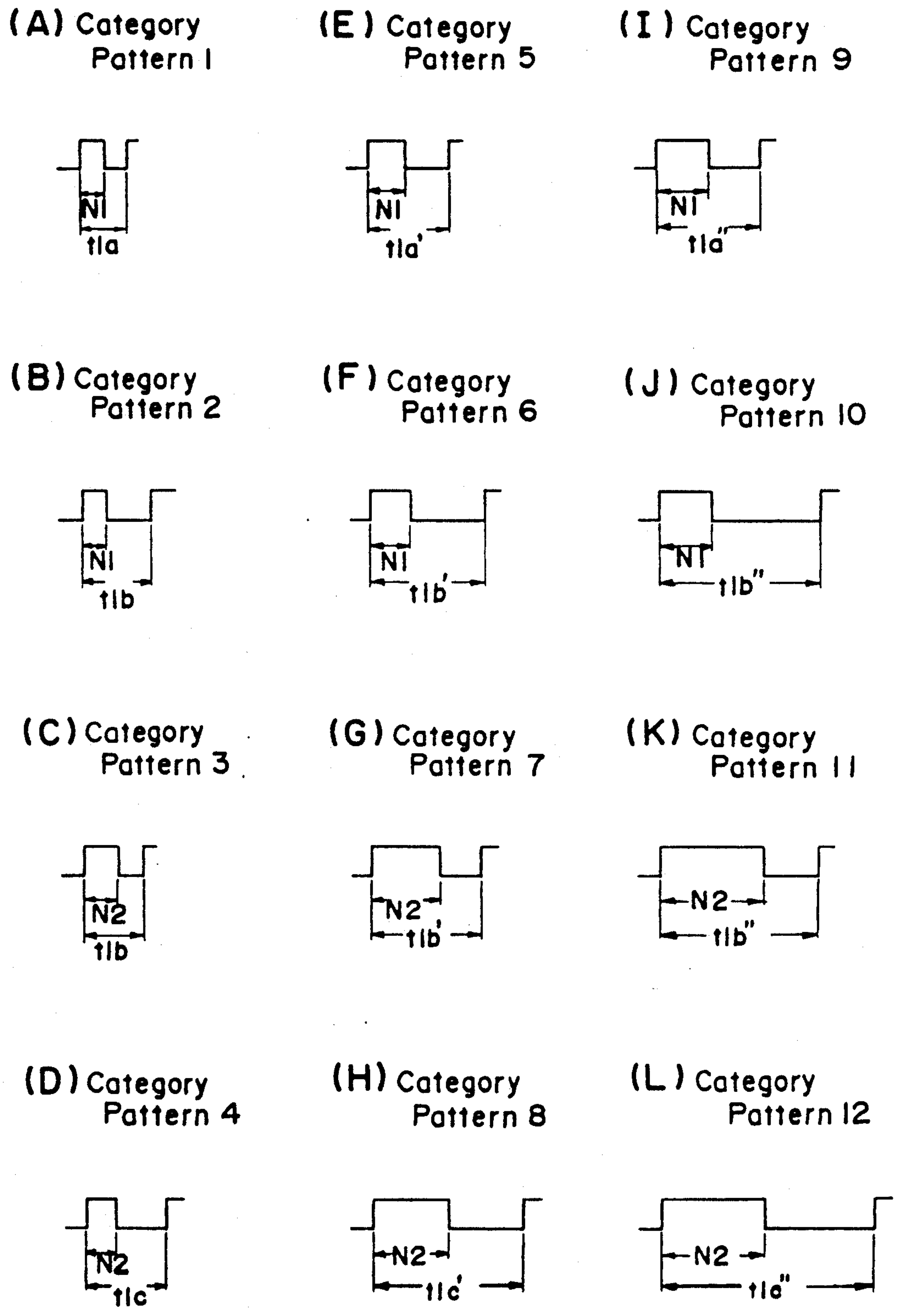
FIG. 7 is a diagram showing category number data.

The operation which takes place during the storing mode will now be described with particular reference to the flowchart of FIG. 6 comprised of FIGS. 6A and 6B.

At the outset, an infrared light emitting window of the to-be-learned remote control device and an infrared light receiving window of the learning remote control device according to the embodiment of the present invention now under discussion are to be positioned in face-to-face relationship so that the remote-controlled signal in the form of an infrared light can be inputted from the to-be-learned remote control device to the learning remote control device according to the embodiment now under discussion, before the storing operation is initiated.

Thereafter, in order to set the learning remote control device in the storing mode, a USE/STORE switch is to be set at a STORE position at step m1 and, then, one of keys of the learning remote control device which is desired to be stored at is manipulated at step m2. Consequently, upon the manipulation of such one of the keys, a single electronic beep is generated at step m3 to indicate that the learning remote control device is in a position ready to receive the remote-controlled signal.

By the manipulation of the key of the to-be-learned remote control device desired to be stored at, a first remote-controlled signal A is inputted at step m4 and, after this remote-controlled signal A has been converted into data, two electronic beeps are generated along with the lighting of a light emitting diode (LED) at step m5 to indicate that the first process has been completed and the next succeeding input operation is invited. Then, the manipulation of the key of both of the to-be-learned remote control device and that of a learning remote control device is released for the time to come at step m6.

By manipulating again the same key of th learning remote control device at step m7, a single electronic beep is generated at step m8 to indicate that the learning remote control device is in a position ready to receive the remote-controlled signal. By manipulating again the same key of the to-be-learned remote control device as that of the learning remote control device, a second remote-controlled signal B can be inputted at step m9.

Thereafter, at step m10, the first and second remote-controlled signals A and B are compared to determine if they coincide with each other. If they coincide with each other, it means that the remote-controlled signal is of a type wherein no code of particular bit vary each time the key is manipulated, that is , the generally utilized remote-controlled signal, and therefore, the remote-controlled signal B is it is stored at step m11, followed by step m12 at which a single electronic beep is generated along with the lighting of a light emitting diode to indicate that the storage has been completed, thereby releasing the key manipulation at step m13.

The foregoing operation for storing the generally utilized remote-controlled signal as described above is substantially identical with that occurring in the prior art learning remote control device.

However, according to the second preferred embodiment of the present invention, in the event that the first and second remote-controlled signals A and B do not coincide with each other as determined at step m10, respective codes of these first and second remote-controlled signals A and B are referred to and a respective decision is made successively at step m14 and m15 to determine if the remote-controlled signal is of a type wherein the code of particular one bit varies or of a type wherein the code of particular two bits varies.

Where the remote-controlled signal is of the type wherein the code of particular one bit varies as determined at step m14, both of the first and second remote-controlled signals A and B are stored at step m16, followed by step m12 at which the electronic beep is generated along with the lighting of the light emitting diode to indicate that the storage has been completed, thereby releasing the key manipulation at step m13.

On the other hand, where the remote-controlled signal is of the type wherein the code of particular two bits varies as determined at step m15, two electronic beeps are generated along with the lighting of a light emitting diode at step m17 to indicate that the input operation is to be repeated. In this way, by temporarily releasing a key manipulation at step m18 and by manipulating again the same key of the learning remote control device which is desired to be stored at at step m19, an electronic beep can be outputted at step m20 to indicate that the learning remote control device is in a position ready to receive the remote-controlled signal. By manipulating the same key of the to-be-learned remote control device as that of the learning remote control device again, a third remote-controlled signal C can be inputted at step m21.

Then, a decision is again made at step m20 in reference to the first, second and third remote-controlled signals A, B and C to determine if they are of a type wherein the particular two bits have changed. If the result of decision at step m22 indicates that they are of the type wherein the particular two bits have changed, a remote-controlled signal D to be outputted the fourth time subsequent to the third remote-controlled signal C is prepared at step m23. In other words, since the remote-controlled signal of the type wherein the particular two bits vary is such that, as hereinbefore described, the first and second bits of the remote-controlled signal vary regularly in a manner of 00, 01, 10, 11, 00, 01, 10, 11, 00, . . . , the remote-controlled signal D to be outputted the fourth time can be readily determined from the first to third remote-controlled signals so received and, therefore, the remote-controlled signal D to be outputted the fourth time is prepared.

The remote-controlled signal D so prepared and the first to third remote-controlled signals A, B and C are then stored at step m24, followed by step m12 at which the electronic beep is generated along with the lighting of the light emitting diode to indicate that the storage has been completed, thereby releasing the key manipulation at step m13.

On the other hand, where the result of decision at step m22 indicates that they are not of a type wherein the particular two bits have changed, four electronic beeps are generated along with the blinking of the light emitting diode at step m25 to indicate to the operator that an error has occurred and, therefore, the key manipulation should be effected again.

The foregoing procedure is to be repeated for each of keys desired to be stored at step m26, followed by the termination of the storing operation. Thereafter, the USE/STORE switch in the learning remote control device should be shifted to a USE position at step m27.

As hereinbefore described, during the storing mode, the remote-controlled signal received in correspondence with the first manipulation of the key of the to-be-learned remote control device and the remote-controlled signal received in correspondence with the second manipulation of the key of the to-be-learned remote control device are compared and, in the event that the both coincide with each other, the remote-controlled signals thereof are stored as is the case with that occurring in the prior art system, but in the event that the both do not coincide with each other, the respective codes of those remote-controlled signals are referred to so that the decision can be made to determine if they are of the type wherein the code of particular bit varies each time the key is manipulated. If they are of such type, the remote-controlled signal corresponding to such type is stored. Acccordingly, not only can the generally used remote-controlled signal be stored as is the case with that in the prior art system, but the remote-controlled signal of the type wherein the code of a particular bit varies, such as employed in some European countries, can also be stored.

It is to be noted that the remote-controlled signal once stored can be reproduced and transmitted in a manner similar to those in the prior art system. In such case, where the remote-controlled signal is of the type wherein the code of particular bit varies, the remote-controlled signal wherein the code of particular bit varies is reproduced and transmitted each time the key is manipulated. In other words, in the foregoing second preferred embodiment of the present invention, with the remote-controlled signal of the type wherein the code of particular one bit varies, the remote-controlled signals A and B are alternately transmitted each time the key is manipulated, but with the remote-controlled signal of the type wherein the code of particular two bits varies, the remote-controlled signals A, B, C and D are successively and cyclically transmitted each time the key is manipulated.

It is also to be noted that, in the foregoing second preferred embodiment of the present invention, in the case of the remote-controlled signal of the type wherein the code of particular two bits varies, the accurate decision has been described as taking place upon receipt of the third remote-controlled signal. However, arrangement may be made that the decision can be made upon receipt of only the second remote-controlled signal or upon receipt of the fourth remote-controlled signal.

Thus, according to the second preferred embodiment of the present invention, the first received remote-controlled signal the to-be-learned remote control device and the second received remote-controlled signal are compared and, in the event tha the both coincide with each other, the remote-controlled signals are stored as is the case with that occurring in the prior art system, but in the event that the both do not coincide with each other, the respective codes of those remote-controlled signals are referred to so that the decision can be made to determine if they are of the type wherein the code of particular bit varies each time the key is manipulated. If they are of such type, the remote-controlled signal corresponding to such type is stored. Accordingly, it is possible to learn not only the generally used remote-controlled signal as well as the remote-controlled signal of the type wherein the code of particular bit varies.

Third Preferred Embodiment

Figure 5:
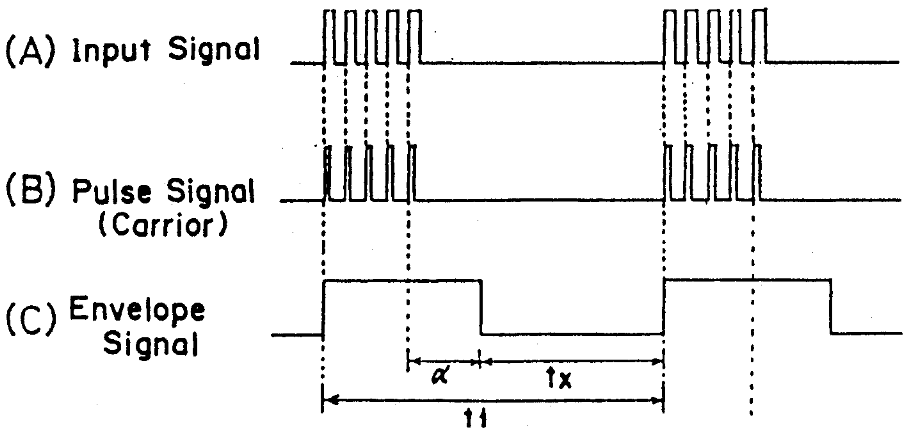
FIG. 5 is a chart showing respective waveforms of various signals used to explain the operation of the system of FIG. 4.

The learning remote control device according to a third preferred embodiment of the present invention which will now be described and the waveforms of various signals used to explain the operation thereof are identical with those shown in FIGS. 4 and 5 in connection with the second preferred embodiment of the present invention, respectively. Accordingly, for the sake of brevity, the details of the learning remote control device according to the third preferred embodiment of the present invention and the operation thereof will not be reiterated.

However, according to the third preferred embodiment of the present invention, the storing mode executed by the learning remote control device is performed in a manner as shown in the flowchart shown in FIG. 11 which will be described later. The learning remote control device according to the third preferred embodiment of the present invention is so designed as to generate a so-called RC-5 remote-controlled signal such as employed in some European countries, that is, the remote-controlled signal of a type wherein a particular one bit varies each time the remote control device is manipulated, namely, of a type wherein the third bit from the beginning of the remote control code varies in such a manner, 0, 1, 0, 1, . . . , each time the key is manipulated.

Figure 12:
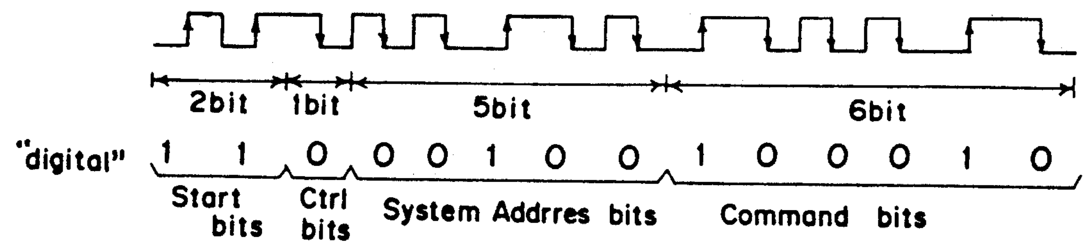
Fig. 12 Prior Art
FIG. 12 is a diagram showing an RC-5 remote-controlled code.
Figure 13:
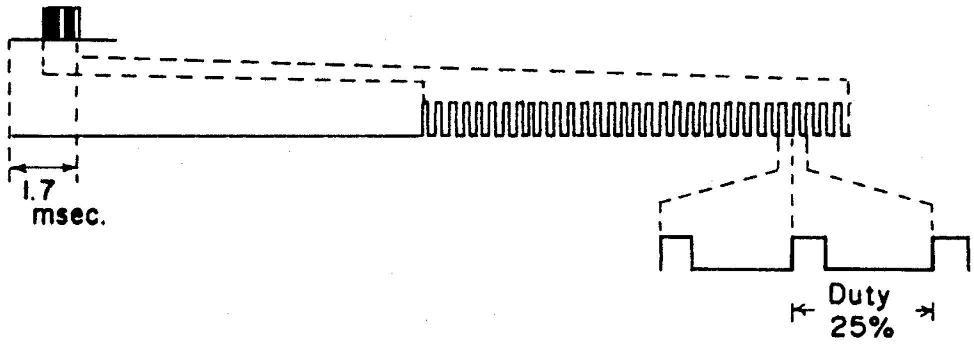
Fig. 13 Prior Art
FIG. 13 is a diagram showing the structure of one bit of the remote-controlled code shown in FIG. 12.

FIG. 12 illustrate the remote control code of the RC-5 signal. This remote control code consists of 14 bits, namely, two start bits, one control bit, five system address bits and six command bits, each of said bits including 32 pulses of 25% in duty ratio and of about 1.7 msec in cycle as shown in FIG. 13.

Figure 14:
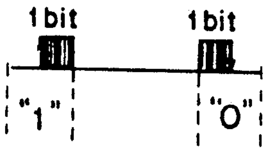
Fig. 14 Prior Art
FIG. 14 is a diagram showing the determination of digital data.
Figure 15:
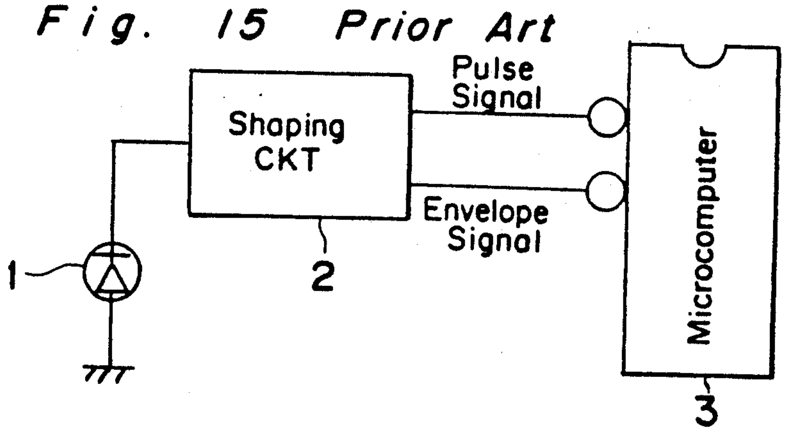
Fig. 15 Prior Art
FIG. 15 is a schematic block circuit diagram showing the prior art remote control device.
Figure 16:
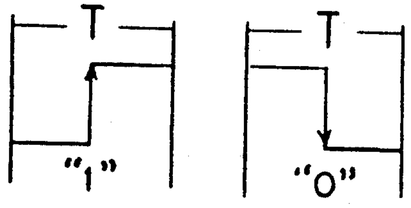
Fig. 16 Prior Art
FIG. 16 is a diagram used to explain the determination of unique logic.
Figure 17:
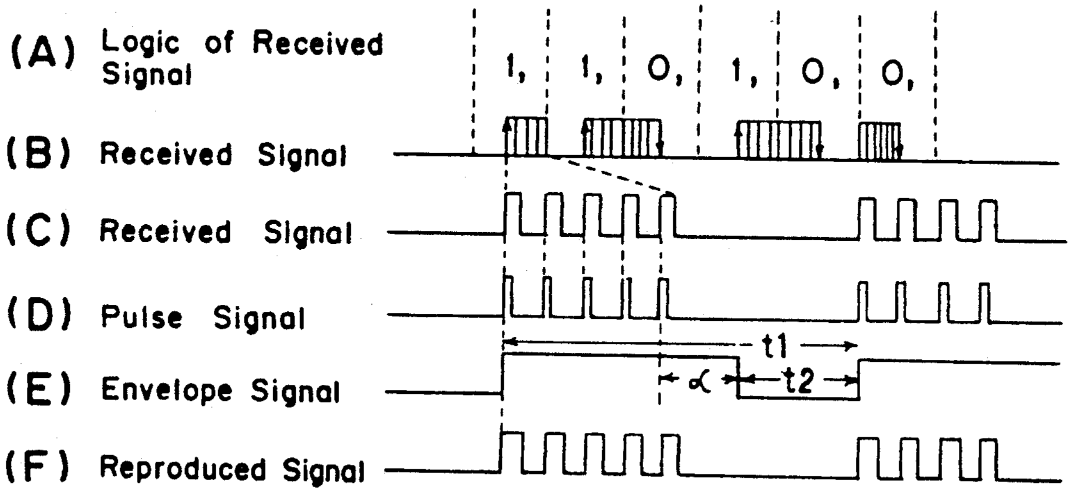
Fig. 17 Prior Art
FIGS. 17 and 18 are charts showing respective waveforms of various signals used to explain the operation of the prior art remote control device.

Also, as shown in FIG. 14, the set-up at the center of each bit and the set-down at the center of each bit correspond respectively to logic levels of "1" and "0".

In this type of remote control code, the first two bits, that is, the start bits, are set to be "1", and the next succeeding control bit, which is called "reversed bit", is of a type which may reverse in logic level state between "0" and "1" each time the same key in a remote-controlling transmitter is manipulated.

In order for the remote-controlled signal of the type wherein the code of particular bit reverses each time the key is manipulated as hereinbefore described, that is, the so-called RC-5 signal , to be learned, the learned; the learning remote control device according to the third preferred embodiment is so designed as follows.

In other words, arrangement has been made so that the RC-5 signal shown in FIG. 12 is categorized into a plurality of category data for two or three bits so that it can be stored as a category number data (number of the category).

These category data are understood in the form as patterned and are basically available in four kinds as shown in FIGS. 7(A) to 7(D), and the 14-bit remote-controlled signal shown in FIG. 12 can be recognized as a combination of the four category patterns 1 to 4.

Each of the four category patterns 1 to 4 can be defined by the previously described period t1 (the period from the initial set-up timing to the next succeeding set-up timing of the envelope signal) and the pulse number N (the number of pulse signals present within the period t1).

The four category patterns 1 to 4 shown in FIGS. 7(A) to 7(D), respectively, have their pulse number N and period t1 indicated by N1, t1*a*; N1, t1*b*; N2, t1*b*; and N2, t1*c*, respectively.

As described with reference to FIG. 13, the pulse numbers N1 and N2 are 32 and 64, respectively, and each of the periods t1*a*, t1*b* and t1*c* is a period defined in correspondence with the carrier frequency of the remote-controlled signal.

Figure 8:
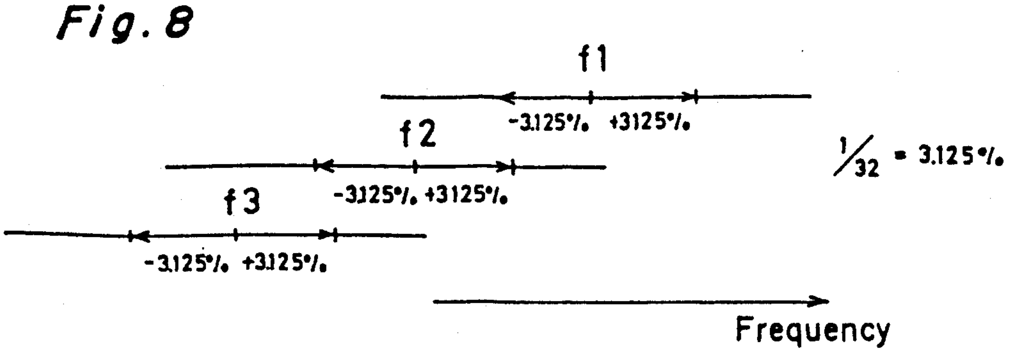
FIG. 8 is a diagram showing respective ranges of frequency of carrier waves.

The carrier frequency referred to above varies with the type of the remote-controlling transmitter and may possibly extend to a wide frequency range and, therefore, in the third preferred embodiment of the present invention, the category patterns are divided into 12 types (i.e., $4\times3=12$) as shown in FIGS. 7(A) to 7(L) so that, as shown in FIG. 8, the remote-controlled signals of three groups of carrier frequencies f1, f3 and f3 can be classified.

Thus, the above described category patterns 1 to 4 correspond to the carrier frequency f1 shown in FIG. 8; the category patterns 5 to 8 correspond to the carrier frequency f2 shown in FIG. 8; and the category patterns 9 to 12 correspond to the carrier frequency f3.

Accordingly, the RC-5 signal of the carrier frequency shown in FIG. 8 can be recognized as a combination of the four category patterns of any one of the three carrier frequency groups depending on particular respectively values of the period t1 and the pulse number N possessed by the remote-controlled signal. In other words, the remote-controlled signal received may take one of the three combinations of the category patterns 1 to 4, the category patterns 5 to 8 and the category patterns 9 to 12.

In order to classify the received remote-controlled signal into one of the 12 category patterns 1 to 12, the microcomputer used in the practice of the third preferred embodiment of the present invention employs a read-only memory (ROM storing device) in which data of the period t1 and the pulse number N which provides the basis for the classification of the received remote-controlled signal into one of the 12 category patterns are stored. In practice, since the period t1 is affected by the carrier frequency, the period t1 in the practice of the third preferred embodiment of the present invention is given an allowance of about 3.125% ($=1/32$) and, therefore, depending on the carrier frequency, there may be a possibility that the received remote-controlled signal may be classified into two carrier frequency groups. In such case, a decision by majority is employed to classify the received remote-control signal to the majority carrier frequency group.

As hereinabove described, the received remote-control-led signal can be classified by the microcomputer having a function of a converting device to one of the 12 category patterns and then converted into a particular one of the category number data, that is, the number of one of the category patterns.

Figure 9:
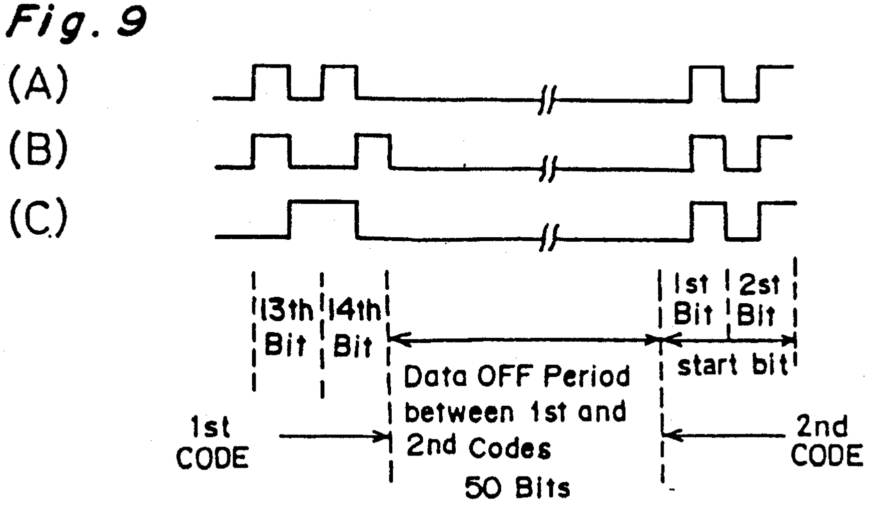
FIG. 9 is a diagram showing respective pause periods of codes.

It is to be noted that, so long as the same key is manipulated, the same code can be outputted after a predetermined pause period. However, as shown in FIG. 9, by categorizing a pause period between the previous code and the subsequent code to one of category patterns in a manner similar to that described hereinabove, it can be stored as a category number data.

In the case of the RC-5 signal, since the code of particular bit reverses each time the key is manipulated, the category number data obtained by converting the remote-controlled signal resulting from the first key manipulation may not coincide with the category number data obtained by converting the remote-controlled signal resulting from the second key manipulation. In view of this, in the third preferred embodiment of the present invention, the following arrangement has been made so as to cope with the reversal of the control bit of the RC-5 signal.

Figure 10:
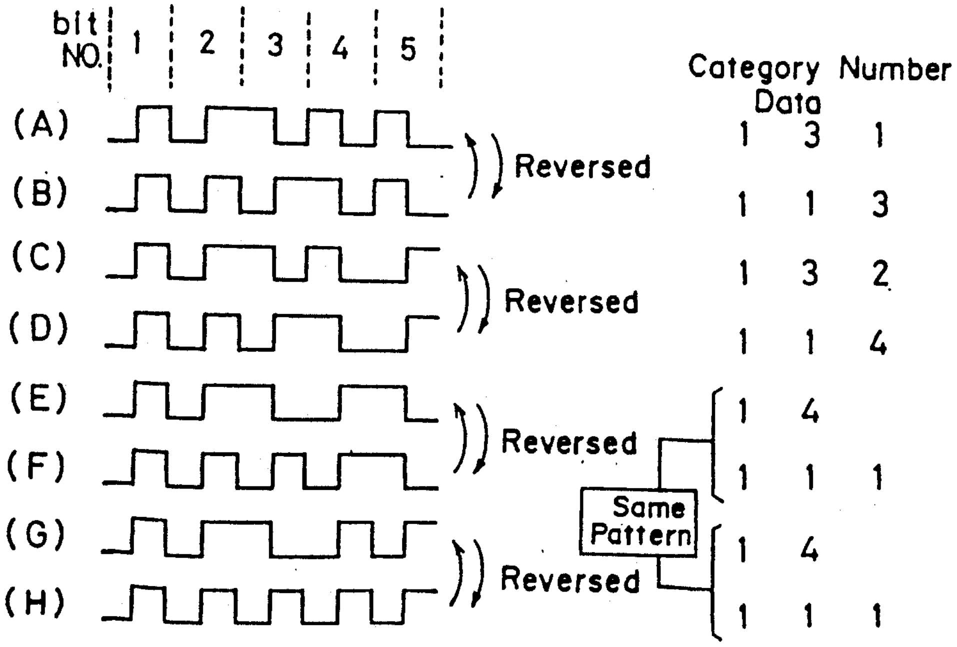
FIG. 10 is a diagram showing respective patterns corresponding to the reversal of control bits.

FIG. 10 illustrates the start bits, the control bit and a portion of the system address bits, as well as the category number data (category numbers) classified to the above described category patterns. FIG. 10 also illustrate the patterns necessary to make the above described category number data in correspondence with the reversal of the control bit. Since (E), (F) and (G), (H) shown in FIG. 10 take the same patterns, respectively, it will readily be understood that the six patterns (A) to (F) shown in FIG. 10 would suffice.

By way of example, where the category number data represent 1, 3, 1 as shown in FIG. 10(A), the reversed category number data in the event of the reversal of the control bit may represent 1, 1, 3 as shown in FIG. 10(B). Similarly, where the category number data represent 1, 3, 2 as shown in FIG. 10(C), the reversed category number data in the event of the reversal of the control bit may represent 1, 1, 4 as shown in FIG. 10(D).

Accordingly, once the category number data of the remote-controlled signal resulting from the first manipulation of the key is given, the reversed category number data in which the control bit has been reversed as a result of the second manipulation of the key can be recognized.

In view of the foregoing, the microcomputer 15 which acts as a reversed category number data formulating means according to the patterns can formulate the reversed category number data, in which the control bit has been reversed, on the basis of the category number data of the remote-controlled signal resulting from the first key manipulation.

It is to be noted that the category number data following the category number data shown in FIG. 10 remain the same even if the control bit is reversed.

Also, the microcomputer 15, during the storing mode during which the storing operation takes place for storing the remote-control signal, compares the reversed category number data, in which the particular bit of the remote-controlled signal has been reversed as a result of the first key manipulation, with the category number data of the remote-controlled signal resulting from the second key manipulation and stores it in the static random access memory 14 in the event that both category number data coincide with each other.

When the remote-controlled signal is to be reproduced, the category number data are read out from the static random access memory 14 and, after having processed in a manner substantially reverse to that described hereinabove in connection with the categorizing process, the remote-controlled signal is reproduced and then transmitted.

Thus, the learning remote control device according to the third preferred embodiment of the present invention makes use of the microcomputer 15 having respective functions of a storage means in which the category data providing the basis for the conversion of the remote-controlled signal into the category number data; a converting device for categorizing the received remote-controlled signal according to the category data in the storage device to provide category number data; a reversed category number data formulating device for formulating the reversed category number data, wherein the particular bit of the category number data has been reversed, on the basis of the category number data which have been converted by the converting device; and a comparing device for comparing the reversed category number data, corresponding to the remote-controlled signal received in correspondence with the first manipulation of a key during the storage mode in which the remote-controlled signal can be stored, and the category number data, corresponding to the remote-controlled signal received in correspondence with the second manipulation of a key, with each other. This microcomputer 15 is operable in such a manner that, when the reversed category number data corresponding to the first manipulation of the key and the category number data corresponding to the second manipulation of the key coincide with each other, the category number data can be stored in the static random access memory in response to an output from the comparing device.

Figure 11A:
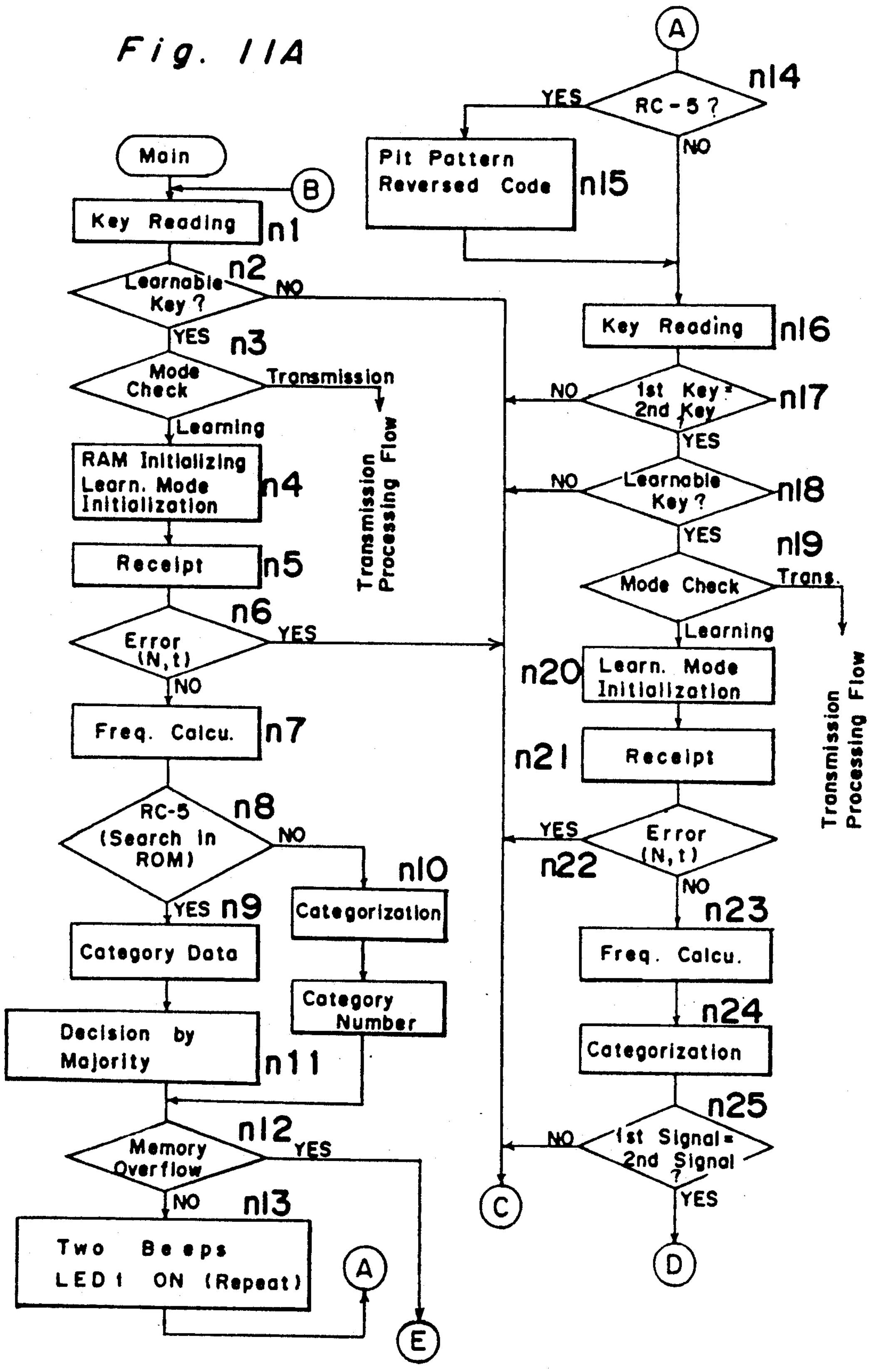
FIG. 11 comprised of FIGS. 11A and 11B is a flowchart showing the sequence of operation of the system according to a third preferred embodiment of the present invention.
Figure 11B:
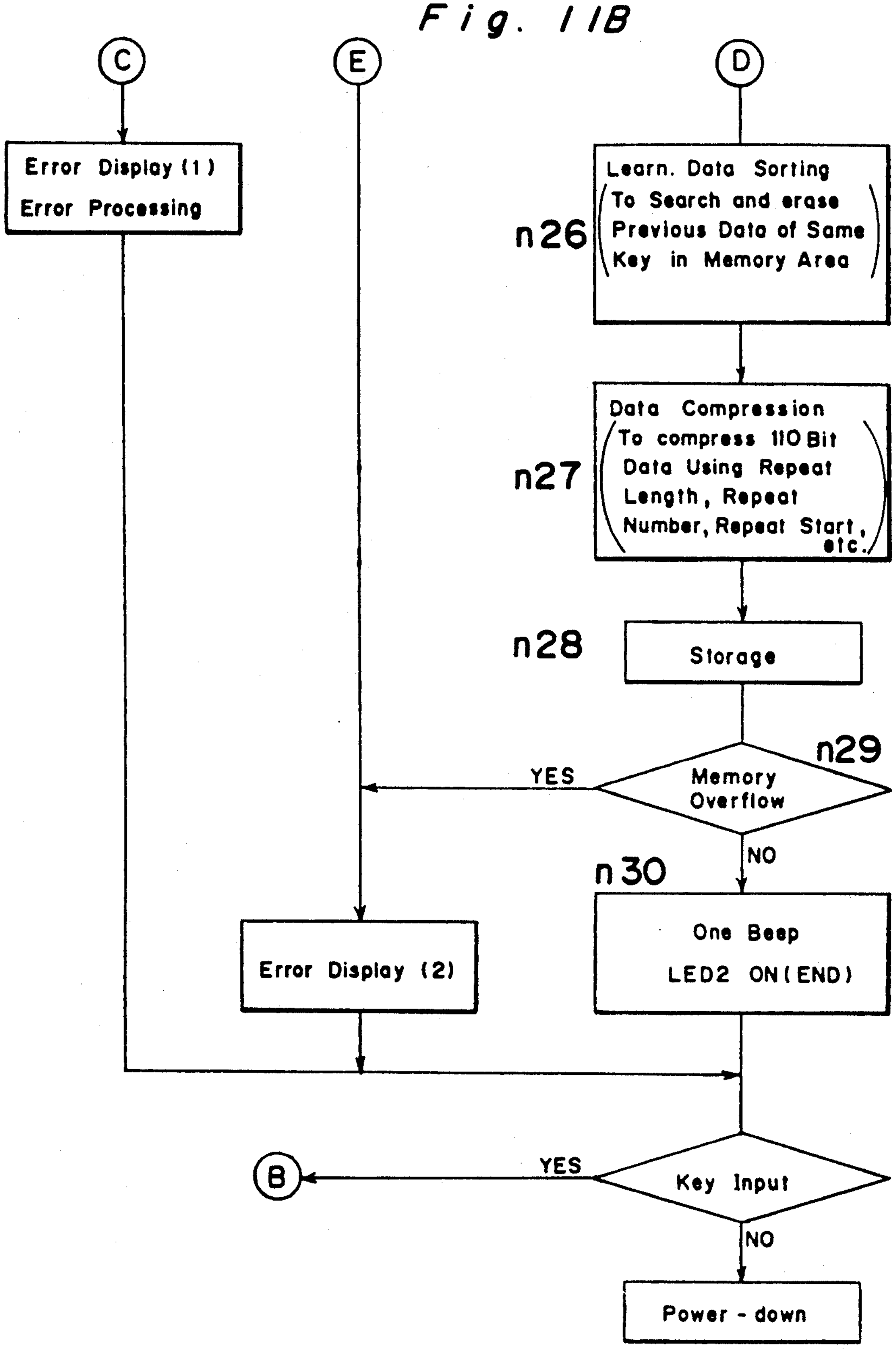

The operation which takes during the storing mode will now be described with reference to the flowchart shown in FIG. 11 comprised of FIGS. 11A and 11B.

Referring to FIG. 11 and at step n1, the key of the learning remote control device which has been manipulated is read and, at subsequent step n2, a decision is made to determine if the key is a learnable key. If the result of decision at step n2 indicates a learnable key, a mode check takes place at step n3 and, in the event that the result of the mode check indicates the storing mode, the program flow proceeds to step n4 at which the random access memory is initialized, followed by step n5 at which a receiving process takes place. Then at step n6, a decision is made to determine if an error has occurred during the receiving process and, in the event that the result of decision at stem n6 indicates that no error has occurred, the program flow proceeds to step n7 at which the carrier frequency is calculated, followed by step n8.

At step n8, a decision is made to determine if the received remote-controlled signal is an RC-5 signal. In other words, a decision is made to determine if it can be classified according to the category data stored in the storage device and, if it is possible to classify, it means that the received remote-controlled signal is the RC-5 signal and, therefore, the program flow proceeds to step n9, but if it is not possible to classify, it means that the received remote-controlled signal is not the RC-5 signal, but the generally used remote-controlled signal, and, therefore, the program flow proceeds to step n10 at which the categorization takes place in a manner similar to that effected with the generally used remote-controlled signal according to the prior art system.

At step n9, the remote-controlled signal is converted to provide the corresponding category number data, followed by step n11 at which, based on the decision by majority, the carrier frequency group is unified. Then at step n12, a decision is made to determine if an overflow takes place in the memory. If no overflow takes place in the memory, the program flow proceeds to step n13 at which a first processing terminates and an indicating sound requesting that the key should be manipulated again is outputted along with the lighting of a light emitting diode, followed by step n14. At step n14, a decision is made to determine if the first received remote-controlled signal is an RC-5 signal and, in the event that the result of decision at step n14 indicates the RC-5 signal, the program flow proceeds to step n15 at which the category number data is recognized and, based on this recognized category number data, the reversed category number data are formulated, followed by step n16. However, if the result of decision at step n14 indicates that the first received remote-controlled signal is not the RC-5 signal, the program flow proceeds directly to step n16.

At step n16, the key of the learning remote control device which has been manipulated subsequently is read and, at subsequent step n17, a decision is made to determine if the first manipulated key is identical with the second manipulated key. If they are the same, the program flow proceeds to step n18 at which a decision is made to determine if it is a learnable key. Should the result of decision at step n18 indicates that the key is a learnable key, step n19 takes place at which a mode check is carried out. In the event that the result of the mode check at step n19 indicates the storing mode, the program flow proceeds to step n20 at which the random access memory is initialized, followed by step n21 at which a receiving process takes place. Then, at step n22, a decision is made to determine if an error has occurred during the receiving process and, in the event that no error has occurred, the program flow proceeds to step n23 at which the carrier frequency is calculated, followed by step n24.

At step n24, and in the event that the received remote-controlled signal is the RC-5 signal, it is converted into the category number data as is the case with the first conversion, but in the event that it is not the RC-5 signal, the categorization takes place in a manner similar to that according to the prior art system, followed by step n25. At step n25, a decision is made to determine if, in the case of the first received signal, that is, in the case of the RC-5 signal, the reversed category number data and the category number data of the second received signal are compared and, if they both coincide with each other, step n26 takes place at which the previous data of the same key number in a memory area is erased. At subsequent step n27, actual one data is detected from the remote-controlled signal received repeatedly and continuously from a counter party and, using such data as the repeat start, the repeat length and the repeat number, the data are compressed, followed by step n28 at which they are stored in the memory. Then, at step n29, a decision is made to determine if an overflow occurs in the memory and, in the event that no overflow occur, the program flow proceeds to step n30 at which an electronic beep is generated along with the lighting of a light emitting diode to indicate that the storing operation has been completed.

As hereinbefore described, in the case of the RC-5 remote-controlled signal, it is converted into the category number data and, based on this category number data, the reversed category number data in which the control bit has been reversed are formulated. Then, if this reversed category number data coincide with the category number data of the second received remote-controlled signal, such category number data are stored in the static random access memory. Accordingly, even the RC-5 remote-controlled signal can be learned.

Thus, according to the third preferred embodiment of the present invention, the received remote-controlled signal can be categorized into the plurality of the category data to provide the respective category number data for the required number of bits and, on the basis of the category number data, the reversed category number data corresponding to the remote-controlled signal wherein the particular bit of the remote-controlled signal is reversed are formulated. The reversed category number data corresponding to the first manipulation of the key during the storage mode and the category number data corresponding to the second manipulation of the key are then compared and, in the event that the both coincide with each other, the category number data can be stored in the memory. Therefore, each time the key of the remote control device is manipulated, the remote-controlled signal in which the code of a particular bit varies can be stored Although the present invention has been described in connection with the preferred embodiments thereof with reference to the accompanying drawings, it is to be noted that various changes and modifications are apparent to those skilled in the art. Such changes and modifications are to be understood as included within the scope of the present invention as defined by the appended claims, unless they depart therefrom.

What is claimed is:

1. A learning remote control device of a type capable of receiving and storing a remote-controlled signal from a to-be-learned remote control device and capable of reproducing the stored remote-controlled signal for transmission, said learning remote control device comprising:

an input port means for receiving a received remote-controlled signal;

a determining means for determining whether or not the received remote-controlled signal is of a particular format wherein the code of a particular bit varies each time a particular key of a to-be-learned remote control device is operated, by referring to a first remote-controlled signal received in correspondence with the first key manipulation of the particular key of the to-be-learned remote control device and a second remote-controlled signal received in correspondence with the second key manipulation of the particular key of the to-be-learned remote control device, in the event that said remote-controlled signal received in correspondence with the key manipulation of the particular key of the to-be-learned remote control device and said remote-controlled signal received in correspondence with the second key manipulation of the particular key of the to-be-learned remote control device do not coincide with each other and the remote-controlled signal is of a type wherein the code of the particular bit varies thereby determining that the remote-controlled signal is of the particular format;

a storing means for converting the first and second remote-controlled signals into data and for storing the first and second remote-controlled data in a memory when the determining means determines that the received first and second remote-controlled signals are the particular format; and a reproducing means for reproducing the first and second remote-controlled signals of the particular format on the basis of the data stored in the memory.

2. A learning remote control device capable of receiving a remote-controlled signal of a type wherein a particular bit of a remote-controlled code derived from the remote-controlled signal alternates between two states each time a key of a to-be-learned remote control device which originates the received remote-controlled signal is manipulated, categorizing the remote-controlled signal into a plurality of category number data, storing the category number data in a memory and reproducing and transmitting the remote-controlled signal on the basis of the category number data read out from the memory, said learning remote control device comprising:

an input port means for receiving a received remote-controlled signal;

a storage means for storing category data which provides a reference for the categorization of said remote-controlled signal;

a converting means for categorizing the received remote-controlled signal according to the category data in the storage means to provide category number data;

a reversed category number data formulating means for formulating reversed category number data representative of the alternate remote-control code corresponding to said key on the basis of the category number data converted by the converting means;

a comparing means for comparing a reversed category number data, corresponding to the remote-controlled signal received in correspondence with the first manipulation of a particular key of a to-be-learned remote control device which originates the received remote-controlled signal during a storage mode in which the remote-controlled signal can be stored, and a category number data, corresponding to the remote-controlled signal received in correspondence with the second manipulation of the particular key, with each other and providing data related to the comparison of the category number data to an output of the comparing means;

the storage means further comprising means for storing the category number data in a memory on the basis of the output of the comparing means when the reversed category number data corresponding to the first manipulation of the particular key and the category number data corresponding to the second manipulation of the particular key coincide with each other; and a reproducing means for alternately reproducing the reversed and non-reversed remote-controlled signals on the basis of the category number data stored in the memory.

3. The learning remote control device according to claim 2, further comprising:

a wave shaping circuit for shaping the received remote-controlled signal and for outputting a pulse signal and an envelope signal;

a signal decoding means for determining whether or not the received remote-controlled signal is a remote-controlled signal of particular format in which the encoding of the bits is a function of the set-up and set-down timings of the pulse signal within a predetermined time T; and a storing means for converting the remote-controlled signal into data and for storing the data in a memory on the basis of the remote-controlled signal inputted to the input port means in the event that the determining means determines that the received remote-controlled signal is a remote-controlled signal of the particular format; and wherein the reproducing means comprises signal encoding means for reproducing the remote-controlled signal of the particular format on the basis of the data stored in the memory.

4. A learning remote control device, comprising:

an input port means for receiving a received remote-controlled signal;

a storage means for storing category data which provides a reference for the categorization of said remote-controlled signal;

a converting means for categorizing the received remote-controlled signal according to the category data in the storage means to provide category number data;

a reversed category number data formulating means for formulating reversed category number data, a reversed category number data is formed by alternating a particular bit of the category number data converted by the converting means between two states;

a comparing means for comparing reversed category number data, corresponding to the remote-controlled signal received in correspondence with the first manipulation of a particular key of a to-be-learned remote control device which originates the received remote-controlled signal, and category number data, corresponding to the remote-controlled signal received in correspondence with the second manipulation of the particular key, with each other and providing data related to the comparison of the category number data to an output of the comparing means;

the storage means further comprising means for storing the category number data in a memory on the basis of the output of the comparing means when the reversed category number data corresponding to the first manipulation of the particular key and the category number data corresponding to the second manipulation of the particular key coincide with each other; and a reproducing means for reproducing the reversed and non-reversed remote-controlled signals on the basis of the basis of the category number data stored in the memory.

* * * * *

UNITED STATES PATENT AND TRADEMARK OFFICE
CERTIFICATE OF CORRECTION

PATENT NO. : 5,043,723

DATED : August 27, 1991

INVENTOR(S) : Araki et al.

It is certified that error appears in the above-identified patent and that said Letters Patent is hereby corrected as shown below:

Column 1, line 32; "bl" should read --"1"--.

Column 13, line 48; delete "the learned;" after the word "learned,".

Column 14, line 15; "f3" should read --f2--.

Column 14, line 26; "respectively" should read --respective--.

Column 15, line 60; "means" should read --device--.

Column 16, line 34; "stem" should read --step--.

Column 20, line 52, claim 4; delete "of the basis" after the word "basis".

Signed and Sealed this

First Day of February, 1994

Attest:

Bruce Lehman

BRUCE LEHMAN

*Attesting Officer*

*Commissioner of Patents and Trademarks*